United States Patent
Forster

(10) Patent No.: US 8,159,359 B2
(45) Date of Patent: Apr. 17, 2012

(54) FUNCTION CHECK FOR A GAS-ALARM ANNUNCIATOR

(75) Inventor: Martin Forster, Jona (CH)

(73) Assignee: Siemens Aktiengesellschaft, Munich (DE)

( * ) Notice: Subject to any disclaimer, the term of this patent is extended or adjusted under 35 U.S.C. 154(b) by 376 days.

(21) Appl. No.: 12/573,257

(22) Filed: Oct. 5, 2009

(65) Prior Publication Data

US 2010/0085201 A1  Apr. 8, 2010

(30) Foreign Application Priority Data

Oct. 3, 2008  (EP) .................................... 08165802

(51) Int. Cl.
  G08B 17/10  (2006.01)
  G08B 13/18  (2006.01)
(52) U.S. Cl. ................ 340/632; 340/627; 73/1.03
(58) Field of Classification Search .......... 340/627, 340/628, 629, 632, 633, 634; 73/1.03, 1.05, 73/724, 728, 864.52; 261/74, 82
See application file for complete search history.

(56) References Cited

U.S. PATENT DOCUMENTS

| | | | |
|---|---|---|---|
| 3,549,134 A * | 12/1970 | Muratov et al. ................ 261/74 |
| 3,693,401 A | 9/1972 | Purt et al. |
| 3,817,108 A | 6/1974 | Principe et al. |
| 4,715,985 A | 12/1987 | Pean et al. |
| 4,987,783 A * | 1/1991 | D'Antonio et al. .......... 73/432.1 |
| 5,589,639 A * | 12/1996 | D'Antonio et al. ............. 73/724 |
| 6,408,895 B1 * | 6/2002 | Beam .............................. 141/59 |
| 6,739,350 B1 * | 5/2004 | Op De Beeck et al. ....... 137/202 |
| 2006/0283707 A1 | 12/2006 | Kuhn |
| 2006/0290525 A1 * | 12/2006 | Andersen et al. ............. 340/632 |
| 2008/0156071 A1 | 7/2008 | Tobias |

FOREIGN PATENT DOCUMENTS

| | | |
|---|---|---|
| CH | 501284 A | 12/1970 |
| DE | 19708052 A1 | 11/1997 |
| EP | 1669961 A1 | 6/2006 |
| GB | 1440785 A | 6/1976 |
| GB | 2305917 A | 4/1997 |
| GB | 2342097 A | 4/2000 |
| GB | 2427480 A | 12/2006 |
| WO | 2008082934 A1 | 7/2008 |

* cited by examiner

*Primary Examiner* — Van T. Trieu
(74) *Attorney, Agent, or Firm* — Laurence A. Greenberg; Werner H. Stemer; Ralph E. Locher

(57) ABSTRACT

A test device, for checking the functioning capability of a gas-alarm annunciator, has a reservoir in which are located a target fluid and a carrier fluid. At least a part of the carrier fluid is present in a liquid aggregate state and the target fluid is at least partially dissolved in the liquid carrier fluid. An extraction device engages into the reservoir such that the target fluid can be extracted along with the liquid carrier fluid. The target fluid is constituted such that on reaching a coverage area of a properly functioning gas-alarm annunciator it will cause the gas-alarm annunciator to annunciate an alarm. A test system and a test method for checking a gas-alarm annunciator's functioning capability use such a test device.

14 Claims, 6 Drawing Sheets

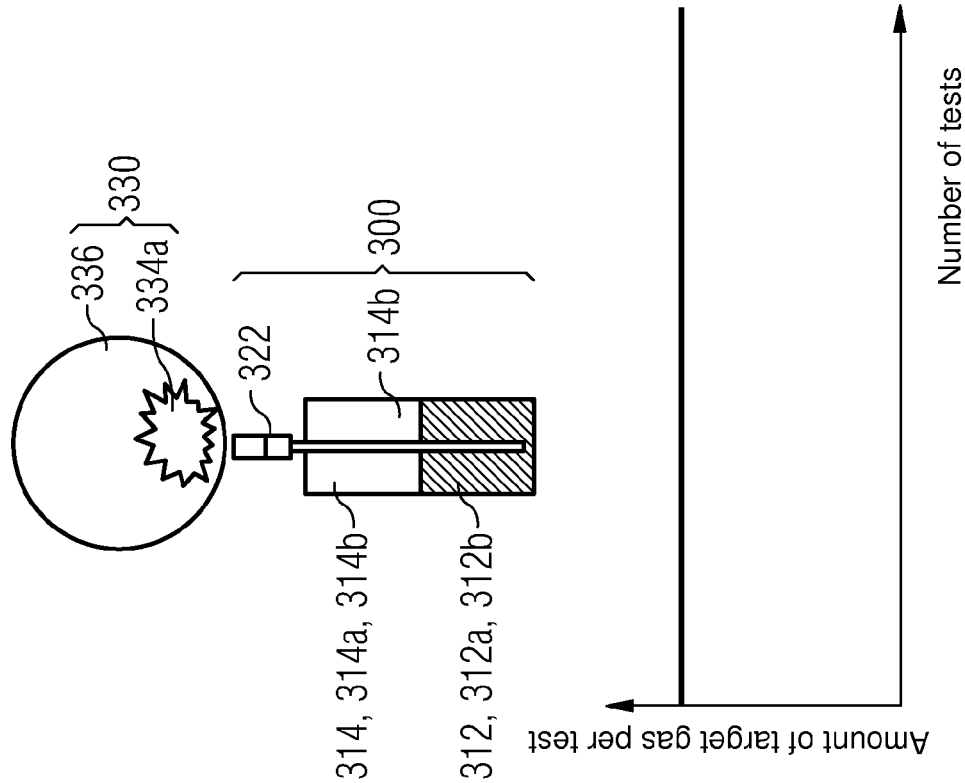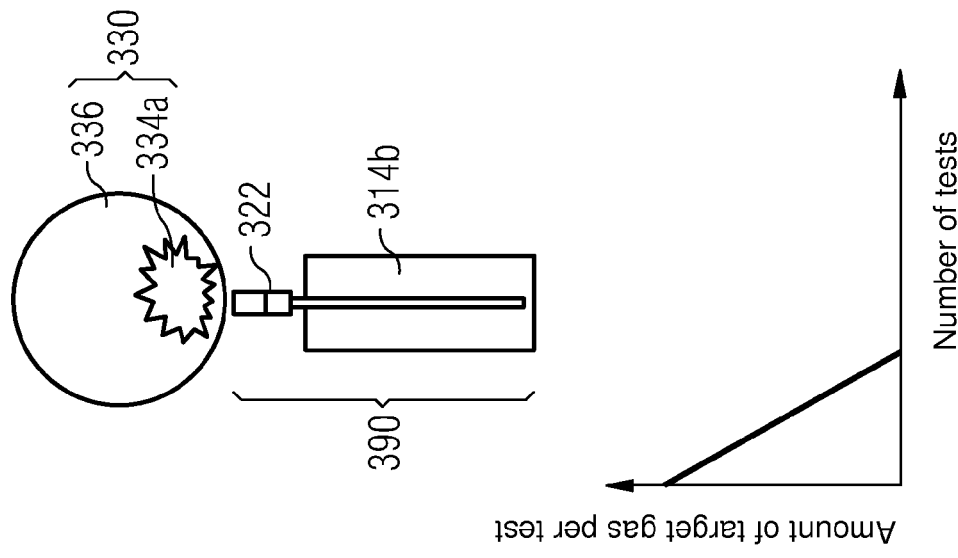

FUNCTION CHECK FOR A GAS-ALARM ANNUNCIATOR

CROSS-REFERENCE TO RELATED APPLICATION

This application claims the priority, under 35 U.S.C. §119, of European application EP 08165802, filed Oct. 3, 2008; the prior application is herewith incorporated by reference in its entirety.

BACKGROUND OF THE INVENTION

Field of the Invention

The present invention relates to the technical field of gas-alarm annunciators which annunciate an alarm in the presence of a pre-specified gas. The present invention relates in particular to a test device, a test system, and a test method for checking a gas-alarm annunciator's functioning capability. The present invention relates further to a method for producing the test device.

For the early detection of fires, CO gas-alarm annunciators are frequently installed which detect the carbon monoxide (CO) that develops in the case of smoldering fires. The CO gas-alarm annunciators have to be periodically tested for proper functioning using the relevant gas; purely electronic testing of the gas-alarm annunciators is often no longer acceptable to safety authorities. Given the very large number of such gas-alarm annunciators already in use in many different embodiment variants, it is necessary to employ a suitable method that can be applied to any gas-alarm annunciator so that the different gas-alarm annunciators can be checked simply and economically. The same also applies to gas-alarm annunciators and gas sensors able to detect gases other than CO and warn against them.

The functioning of gas-alarm annunciators and gas sensors is typically checked by ducting a test-gas mixture up to the gas-alarm annunciator or its gas sensor. The test-gas mixture can be contained within a customary low-pressure aluminum canister and be at an overpressure of maximum 10 bar at +23° C. Higher pressures are not allowed because standard low-pressure aluminum canisters are permitted only for a maximum pressure of 11 bar overpressure at +50° C. and the overpressure will be reached if the canister having an overpressure of 10 bar is heated from +23° C. to +50° C. Standard low-pressure aluminum canisters of such type having a capacity of 350 ml can be used for approximately 30 to 40 test operations. The canisters will thereafter be at least almost completely empty. The pressure will therein continuously reduce over the course of the test operations owing to the test-gas mixture's sequential consumption. Thus each time less test-gas mixture will be released whenever a gas-alarm annunciator is tested, and mixing with the ambient air will hence each time cause a smaller concentration of the target gas, intended to initiate the gas reaction by way of a test, to be applied to the gas-alarm annunciator. A clear function check will be made much more difficult as a result.

That effect could be partially remedied by letting the test-gas mixture discharge for longer during each successive test operation than during the preceding one to achieve the result of producing the same amount of target gas and hence the same concentration thereof within the gas-alarm annunciator's coverage area. Compensating of this kind is not possible in practice, though, because a test person typically will not know the pressure presently prevailing in the relevant canister and, if such be the case, how long to allow the test-gas mixture containing the target gas to discharge.

Another possibility for remedying that negative situation is not to use standard low-pressure aluminum canisters but very large low-pressure canisters instead that have a capacity of 2 to 5 liters and contain a simple pressure-control valve. The test-gas mixture will then be blown across the gas-alarm annunciator at an approximately constant output pressure for a period of up to 60 seconds. A stationary concentration of the target gas will therein become established and each test operation can take place with the same concentration of target gas. However, it will then be possible to perform a maximum of only about 40 tests per canister with the test-gas mixture because in that case a much larger amount thereof will be consumed. That possibility is, though, disadvantageous in that the economical standard low-pressure aluminum canisters can no longer be used, in that a pressure-control valve will be required, and in that the entire apparatus having a canister with a capacity of up to 5 liters will be very cumbersome to handle. It must further be considered that gas-alarm annunciators are frequently installed at a height of up to 5 m above the floor so that apparatuses of this type will be rendered even more difficult to handle.

Attention is drawn to the fact that the use of known high-pressure gas cylinders containing the test-gas mixture at a pressure of up to 200 bar would give rise to weight-related problems that are even more serious. Even though hundreds of test operations could be performed using such type of high-pressure gas cylinders, they are impractical owing to the difficulty in handling them and the high costs, or would be practical in exceptional cases only.

Known from published British patent application GB 2427480 A is an arrangement having an electrochemical gas sensor and an electrochemical gas generator pneumatically coupled thereto via a conduit. A gas is generated electrochemically in the gas generator by using an electric current to chemically split an aqueous liquid. The gas generated thereby is the target gas whose presence is to be attested by the gas sensor within the scope of a function check. The disadvantage of this arrangement is particularly that only very few gases such as hydrogen, oxygen, and ammonia can be generated from a liquid electrochemically. The arrangement furthermore requires a liquid container that functions only in a specific position. The aqueous solution can also dry out so that the entire arrangement will cease to function at all.

Known from international patent disclosure WO 2008/082934 A1 is a method for checking the functioning capability of a gas-alarm annunciator wherein a fluid is evaporated or a fluid is made to react with a second substance to produce a chemical reaction and a target gas whose presence is to be attested by a gas-alarm annunciator is generated thereby. Via a gas-permeable membrane, the target gas or the vapor from the evaporated fluid reaches the gas-alarm annunciator's gas sensor and there produces the required gas concentration for a function check on the gas sensor. That method has the disadvantage that a fluid reservoir is necessary as well as a pump and an electric heater for evaporating the fluid. A corresponding arrangement by which the method can be implemented will hence be highly complex in apparatus terms.

Known from published, non-prosecuted German patent application DE 19708052 A1 is a test chamber for calibrating gas sensors. Connected to the test chamber are a multiplicity of ampoules filled with a target gas whose presence is to be attested. The ampoules can be electrically opened by valves or blasting wires, thereby releasing a defined amount of target gas. A specific concentration of target gas is thereby produced in the test chamber and the gas sensor located therein can be calibrated. The test chamber described is disadvantaged by having a highly complex mechanical structure.

SUMMARY OF THE INVENTION

It is accordingly an object of the invention to provide a function check for a gas-alarm annunciator which overcomes the above-mentioned disadvantages of the prior art methods and devices of this general type, which improves the checking of a gas-alarm annunciator's functioning capability to the effect of its being possible with a test device to provide a maximum number of test operations at a constant discharge time for the test-gas mixture and with as constant as possible an amount of target gas provided. The aim therein is for checking also to be possible for different types of gas-alarm annunciators that may already have been in use for a considerable length of time.

According to a first aspect of the invention, a test device for checking a gas-alarm annunciator's functioning capability is described. The described test device has a reservoir in which are located a target fluid and a carrier fluid. At least a part of the carrier fluid is present in a liquid aggregate state and the target fluid is at least partially dissolved in the liquid carrier fluid. An extraction device engages into the reservoir such that the target fluid can be extracted along with the liquid carrier fluid, the target fluid being constituted such that on reaching a coverage area of a properly functioning gas-alarm annunciator it will cause the gas-alarm annunciator to annunciate an alarm.

The described test device is based on the knowledge that the target fluid can advantageously be stored in a carrier fluid in dissolved form. The carrier fluid can therein be a specific fluid or else a mixture of two or even more fluids.

What is to be understood by a fluid in this context is a substance that will offer no resistance to however slight a shear stress. So in particular gases as well as liquids are in that sense fluids.

The carrier fluid is gaseous particularly when exposed to normal room conditions such as, for example, a pressure of approximately 1,013 hPa and a temperature of 20° Celsius (° C.). The carrier fluid can become liquid when exposed to an increased pressure of typically up to 5 to 6 bar. The target fluid can then be physically and/or chemically dissolved in the resulting carrier liquid.

The dissolved target fluid is stored in the liquid carrier fluid in liquid form so that a far greater number of test operations can be performed compared with known test devices in the case of which the target fluid is stored in the gaseous phase in a low-pressure container. Because the target fluid is extracted along with the carrier fluid in liquid form from the reservoir in the case of the inventive test device, the amount that discharges can be dosed significantly better that when the target fluid is extracted in gaseous form. Simple controlling of the discharge time will hence always allow roughly the same amount of target fluid to be extracted for each test. So a multiplicity of test procedures can be performed all having at least approximately the same concentration of the target fluid that will then be or become gaseous in the coverage area of the gas-alarm annunciator requiring to be checked.

Attention is drawn to the fact that when the target fluid is extracted from the inventive test device and thereafter applied to the gas-alarm annunciator's coverage area, the actual test-gas mixture does not develop until the target fluid that has been converted to the gaseous state has mixed with the ambient air. The target fluid's concentration can thus be kept at least nearly the same for each test through simple controlling of the amount extracted of the liquid mixture of target fluid and carrier fluid.

Particularly reliable checking of the gas-alarm annunciator is then possible if the carrier fluid, which can also be a mixture of different fluids, exhibits the following properties:

a. the carrier fluid should be present in the liquid aggregate state at room temperature and a pressure of five to six bar;
b. the carrier fluid should neither chemically nor physically influence attesting the gaseous target fluid's presence in the gas annunciator;
c. the carrier fluid must not react chemically with the target fluid; and
d. the target fluid must be soluble in the carrier fluid.

Provided the conditions are met, the entire fluid mixture containing the carrier fluid and the target fluid can be stored advantageously in economical standard low-pressure aluminum canisters having a capacity of approximately 350 ml.

Expressed in clear terms, a fluid mixture containing the target fluid and a second fluid or fluid mixture is inventively used for testing a gas-alarm annunciator. The second fluid or second fluid mixture is preferably a substance that essentially contains no oxygen ($O_2$) or nitrogen ($N_2$), has at +25° C. a vapor pressure of more than one bar and less than, for example, 8 bar, and will not make it impossible to attest the presence of the target gas. The entire fluid mixture can, though, contain small $O_2$ or $N_2$ constituents in the order of not more than 2 percent by volume.

Some terms used in this application are now explained.

A target fluid or target gas is a substance that is registered by the gas-alarm annunciator or its gas sensor. The gas-alarm annunciator will initiate an appropriate action if the target fluid's concentration exceeds or falls below specific values.

A test-fluid mixture or test-gas mixture is a mixture containing the target fluid or target gas and other fluids or gases that will not adversely affect attesting the presence of the target fluid or target gas. The other fluids or gases can be, for example, oxygen and nitrogen (=air) or nitrogen as well as air and the carrier fluids mentioned below.

For checking the functioning capability of the gas-alarm annunciator or its gas sensor, the test-fluid mixture or test-gas mixture is applied to the relevant gas sensor. The relevant gas-alarm annunciator must then display a pre-specified reaction by which it can be insured that the gas-alarm annunciator is functioning properly.

A test is a test operation performed on the gas-alarm annunciator whereby the test-fluid mixture or test-gas mixture is applied to the relevant gas sensor.

The carrier fluid or carrier gas is a fluid or a gas or a mixture with at least one fluid or gas not containing the target fluid or target gas. The carrier fluids or carrier gases typically contain neither air nor nitrogen.

The entire fluid mixture or gas mixture is a mixture of target fluid or target gas with the carrier fluid or carrier gas. Together with the ambient air, the entire fluid mixture or gas mixture constitutes in the gaseous state the actual test-fluid mixture or a test-gas mixture.

According to an exemplary embodiment of the invention, the carrier fluid and target fluid form a test-fluid mixture that is present in the reservoir partially in the liquid phase and partially in the gaseous phase.

The simultaneous presence of a liquid phase and a gaseous phase inside the reservoir has the advantage that the gaseous part of the test-fluid mixture can expand when the liquid test-fluid mixture is selectively extracted. A largely constant pressure can hence be maintained inside the reservoir even when a multiplicity of in each case small amounts of the liquid test-gas mixture are extracted. That has the advantage that the amount of liquid test fluid extracted for each test extraction will in practice become only insignificantly less even in the case of a multiplicity of test extractions.

According to a further exemplary embodiment of the invention, the extraction device has an ascending pipe having a first end and second end, with the first end being located inside the test-fluid mixture's liquid phase and with an extraction valve for extracting the liquid test-fluid mixture being attached to the second end. Through the described use of an ascending pipe whose first and typically lower end is fully immersed in the liquid test-fluid mixture it can be insured that only the liquid phase of the test-fluid mixture will be extracted. The gaseous phase will insure the necessary pressure while the test-fluid mixture is being briefly extracted by briefly opening the extraction valve so that the liquid test-fluid mixture will flow through the ascending pipe. It is, of course, for that purpose necessary for the reservoir to be sufficiently tight for a suitable pressure to be able to develop therein.

According to a further exemplary embodiment of the invention, the target fluid's concentration during the test-fluid mixture's liquid phase is between 1 ppm and 10,000 ppm.

An optimal concentration of the target fluid can be selected for the described test device depending on the specific application, meaning depending particularly on the substances used for the carrier fluid and target fluid. The concentration can therein depend on, for instance, the target fluid's solubility in the carrier fluid.

According to a further exemplary embodiment of the invention, the carrier fluid contains at least one of the following substances: propane, n-butane, iso-butane, dimethylether, or 1,1,1,2-tetrafluorethane. The substances, which can also be used in any mixing ratios, have the advantage of being easy to handle and generally recognized as safe in terms of possible environmental harm.

In particular the substance propane currently appears especially suitable for producing an entire fluid mixture that has carbon monoxide (CO) as the target fluid and which together with the ambient air around the gas-alarm annunciator requiring to be checked generates the test-fluid mixture or test-gas mixture by means of which the functioning capability of a CO gas-alarm annunciator can be checked.

According to a further exemplary embodiment of the invention, the target fluid contains at least one of the following substances: carbon monoxide, carbon dioxide, ethanol, ammonia. The substances can also be used in any mixing ratios.

Attention is drawn to the fact that the above list is not definitive and that other gases can also be used as the target fluid.

The attesting method applied to the gas sensor of the gas-alarm annunciator requiring to be checked can be based on an electrochemical reaction, an optical measurement, and/or an opto-acoustic measurement. Other attesting methods not explicitly listed here can also be used here where applicable.

According to a further exemplary embodiment of the invention, an aerosol precursor is furthermore located in the reservoir. That has the advantage that the functioning capability not only of a gas-alarm annunciator can be checked using the described test device but also, for example, of an optical smoke alarm operating according to the known scattered-light method. The aerosols released when the initially still liquid test-fluid mixture is applied within the optical smoke alarm's coverage area serve therein as scattering particles.

When an aerosol precursor is additionally used, an aerosol that is able to make a smoke alarm sound an alarm as a test can hence form when the entire fluid mixture discharges. Thus the functioning capability on the one hand of the gas-alarm annunciator and on the other also of a smoke sensor located therein can be checked. Put another way, that means that the described test device can be used particularly advantageously also for what is termed a combined hazard detector having both a gas sensor and an optical scattered-light sensor.

The test on a gas-alarm annunciator having an integrated smoke sensor can be performed in such a way, for example, that the entire fluid mixture's liquid phase is sprayed very briefly onto the gas-alarm annunciator or a gas sensor thereof and the fluid mixture or gas mixture resulting therefrom is kept for longer in the gas-alarm annunciator's ambient region. That can be done by, for example, any mechanical barriers defining a test space, separated from the rest of the ambient region, between the test device and gas-alarm annunciator.

According to a further exemplary embodiment of the invention, the aerosol precursor contains at least one of the following substances: sebacic acid bis-2-ethylhexylester, sebacic acid diester with various ester groups, phthalic acid dibutyl ester, and phthalic acid bis-ethylhexyl ester. The substances can also be used in any mixing ratios among themselves and/or with reference to the entire test-fluid mixture located in the reservoir.

The portion of the aerosol precursor in the liquid phase of the entire gas mixture can be, for example, less than or equal to 2.0% percent by weight. The portion of the aerosol precursor is preferably less than or equal to 0.5% percent by weight. An aerosol-precursor concentration in the range between 0.001 and 0.3 percent by weight currently appears especially suitable for insuring reliable checking of both a gas sensor's functioning and of an optical smoke alarm's functioning.

According to a further exemplary embodiment of the invention, an aromatic substance is furthermore located in the reservoir.

The additional use of an aromatic substance will be particularly advantageous if the entire fluid mixture, meaning the mixture containing the carrier fluid, the target fluid, and possibly the aerosol precursor, is odorless and contains, for example, hazardous substances. Hazardous substances can be, for example, toxic and/or flammable substances. Adding an aromatic substance having a clear smell to the entire test-fluid mixture can therefore insure that persons will perceive the test-fluid mixture's presence with their sense of smell. For example users of the described test device can consequently be made aware of the toxic test-fluid mixture's presence so that they will be able to initiate appropriate hazard-averting countermeasures such as, for instance, ventilating a room or exiting it.

What are suitable as aromatic substances are any substances that have a strong smell at a very small concentration and are also non-toxic. Examples of such aromatic substances are mercaptans, acrylates, pyrazines, and/or natural products such as, for instance, a wasabi extract, etc.

According to a further aspect of the invention, a test system for checking the functioning capability of a gas-alarm annunciator is described. The test system has (a) a test device of the above-described type, (b) a holding device for accommodating the test device, and (c) a covering element attached to the holding device and embodied such that between the accommodated test device and a gas sensor of the gas-alarm annunciator a test space can be at least almost spatially separated from the gas-alarm annunciator's ambient region.

The described test system is based on the knowledge that if a test space is provided that can be at least almost separated from the ambient air it will be possible to perform a reliable function check on the gas-alarm annunciator even when only a very small amount of carrier fluid and target fluid is used. That is because that can prevent the gas mixture that develops from the liquid fluid mixture from freely expanding spatially, so that only a very small portion of the gas mixture will as a result be in the coverage area of the gas-alarm annunciator's gas sensor. In other words, preventing the gas mixture that has developed from expanding spatially unrestrictedly can considerably improve the above-described test device's efficiency in terms of the amount of carrier and target fluid needed for a test operation.

The covering element can be, for example, an elastic bellows. Particularly at locations making contact with a wall or ceiling to which the gas-alarm annunciator is attached, the bellows must therein be sufficiently elastic for any unevenness in the gas-alarm annunciator's surface to be at least partially equalized. Damage to the gas-alarm annunciator can be avoided, moreover, by a high degree of elasticity exhibited by the bellows.

The covering element can at least in sections be, for example, conical in shape. The volume of the test space can therein be precisely pre-defined by the covering element's shape.

According to a further aspect of the invention, a test method for checking the functioning capability of a gas-alarm annunciator using a test device of the above-described type is described. The test method has the steps of (a) introducing the liquid carrier fluid along with the target fluid dissolved therein into the gas-alarm annunciator's coverage area, and (b) checking the gas-alarm annunciator's functioning capability, with the gas-alarm annunciator being classified as capable of functioning if an alarm is annunciated by it, and with the gas-alarm annunciator being classified as incapable of functioning if no alarm is annunciated by it.

The described test method is based on the knowledge that a target fluid dissolved in a liquid phase of the carrier fluid can be conveyed into the gas-alarm annunciator's coverage area. On its way into the gas-alarm annunciator's coverage area and no later than when in it, the target fluid then assumes the gaseous state and can initiate a reaction from a gas sensor of the gas-alarm annunciator.

The test on the gas-alarm annunciator can be performed in such a way that the liquid phase of the entire fluid mixture is sprayed only very briefly onto the gas-alarm annunciator. To prevent in particular the target fluid that has become gaseous from escaping from the coverage area through evaporation, the fluid can be kept in close proximity to the gas-alarm annunciator by a suitable mechanical barrier.

According to a further aspect of the invention, a method for producing a test device of the above-described type is disclosed. The production method has the steps of (a) filling the reservoir with the carrier fluid, (b) filling the reservoir with a target fluid, and (c) sealing the filled reservoir so that an overpressure can develop and/or be maintained therein.

The carrier fluid and target fluid can therein be transferred into the reservoir using one, shared filling operation or at least two separate filling operations.

In the case of a shared filling operation the entire fluid mixture or gas mixture can be stored in a large tank and from there put into one or more reservoirs. It is therein possible for some air ($=O_2+N_2$) to remain in the reservoir(s) so that the entire fluid or gas mixture will also contain some air.

The reservoir can be a container of any kind in which a certain overpressure can develop or be maintained compared with the ambient-air pressure. The liquid phase of the fluid or gas mixture can owing to the overpressure be extracted in a simple manner in doses by, for example, opening a valve. The reservoir can be in particular a simple canister made of, for example, aluminum or tinplate.

According to an exemplary embodiment of the invention, the method additionally has the step of evacuating the reservoir performed prior to its being filled with the carrier fluid and with the target fluid.

The target gas is preferably first inserted up to a defined pressure after the evacuating step to insure there will be the necessary amount of target fluid in the reservoir. The carrier fluid can then be inserted into the reservoir. The fluid mixture will then be generated by mixing the carrier fluid with the target fluid, which mixing will typically take place automatically.

What can advantageously be achieved by evacuating the reservoir is that there will be no or only little air in the reservoir when the carrier fluid and/or target fluid are/is inserted.

Attention is drawn to the fact that instead of pre-evacuating the reservoir as described then filling it initially with the pure target fluid, a concentrated mixture of target fluid with an inert gas such as, for example, nitrogen can also be inserted into the reservoir up to a specific pressure. It can thereby also be insured that the necessary amount of target fluid for forming the entire gas mixture will actually be present in the reservoir in sufficient quantity. The carrier fluid, which can also be a mixture of a plurality of fluids, is then inserted into the reservoir. In that case, too, some air (particularly oxygen and nitrogen) can remain in the reservoir so that the entire fluid mixture will also contain some air.

According to a further exemplary embodiment of the invention, the method additionally has the step of filling the reservoir with an inert gas at overpressure then emptying it. Both filling the reservoir at overpressure and emptying it take place before it is filled with the carrier fluid and with the target fluid. That has the advantage that air initially present in the reservoir will be displaced. The described process of filling the reservoir at overpressure then emptying it can also be performed several times in succession to insure particularly thorough removal of air that is present in the reservoir air.

The inert gas can be nitrogen for example.

When the reservoir has been filled at overpressure then emptied, as already described above, it will then be possible to feed in an amount of target fluid, which amount is of sufficient quantity for the necessary amount of target fluid for forming the entire fluid mixture to be present in the reservoir. The reservoir is then filled with the carrier fluid, which can also be a mixture of a multiplicity of fluids, so that the entire fluid mixture can form.

Attention is drawn to the fact that the above-described measures for reducing the portion of air remaining in the reservoir can insure that no explosive fluid or gas mixtures can form in the reservoir. Thus, for example, flammable substances can also be used as the target fluid or target gas and/or carrier fluid or carrier gas without the fear of an explosion hazard when the above-described method for producing a test device is implemented.

Attention is drawn to the fact that embodiment variants of the invention have been described with reference to different kinds of inventive subject matter. Some embodiment variants of the invention have in particular been described using device-related claims and other embodiment variants of the invention using method-related claims. It will, though, be immediately apparent to a person skilled in the relevant art when reading this application that, unless explicitly indicated otherwise, in addition to a combination of features belonging to one kind of inventive subject matter, any combination of features is possible that belong to different kinds of inventive subject matter.

Other features which are considered as characteristic for the invention are set forth in the appended claims.

Although the invention is illustrated and described herein as embodied in a function check for a gas-alarm annunciator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 3A and 3B are schematic overviews showing the difference in apparatus-specific and functional terms between a known test device in the case of which a target fluid is stored only in the gaseous phase and the test device shown in FIG. 1 in the case of which the target fluid has been dissolved in a carrier fluid's liquid phase;

DETAILED DESCRIPTION OF THE INVENTION

Figure 1:
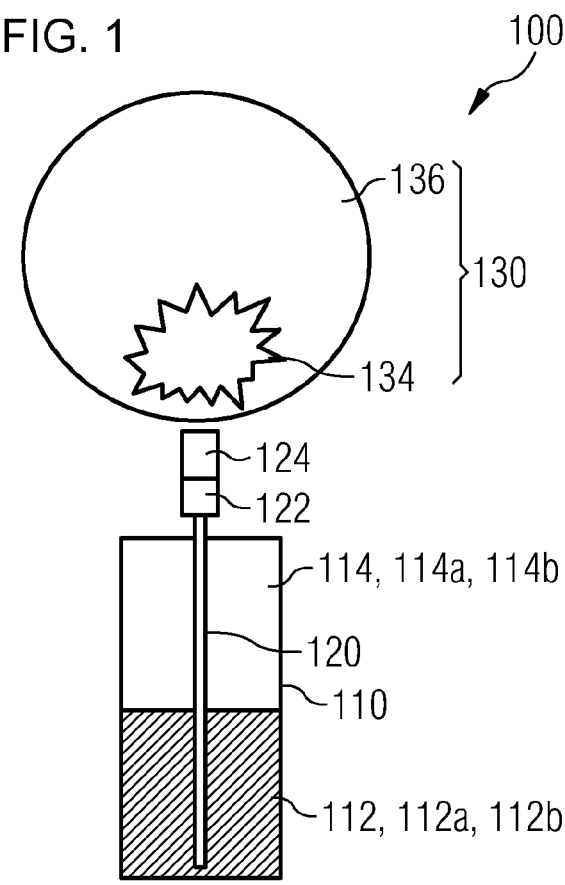
FIG. 1 is an illustration of a test device for checking a functioning capability of a gas-alarm annunciator according to the invention.

Attention is here drawn to the fact that the reference numerals identifying identical or corresponding components mutually differ in the drawing only in their first digit.

Attention is furthermore drawn to the fact that the embodiment variants described below are only a limited selection of possible embodiment variants of the invention. In particular it is possible to suitably combine the features of individual embodiment variants so that a multiplicity of different embodiment variants can be regarded by a person skilled in the relevant art as obviously disclosed with the embodiment variants explicitly shown here.

Referring now to the figures of the drawing in detail and first, particularly, to FIG. 1 thereof, there is shown a test device 100 for checking the functioning capability of a gas-alarm annunciator. The test device 100 has a reservoir in which are located a fluid mixture 112 in a liquid phase and a fluid mixture 114 in a gaseous phase. According to the exemplary embodiment shown here, the reservoir is a canister 110 made of, for example, the material aluminum. Standard low-pressure aluminum canisters of such type are configured for an internal pressure of, for instance, up to 11 bar.

The fluid mixture 112 in the liquid phase contains a liquid carrier fluid 112a and a target fluid 112b dissolved in the liquid carrier fluid 112a. The fluid mixture 114 in the gaseous phase accordingly contains a gaseous carrier fluid 114a and a gaseous target fluid 114b mixed therewith. According to the exemplary embodiment shown here, the target fluid 112b, 114b is carbon monoxide. The carrier fluid 112a, 114a can have propane, n-butane, iso-butane, dimethylether and/or 1,1,1,2-tetrafluorethane.

The reservoir 110 thus contains the liquid phase 112 and the gaseous phase 114 of the entire gas mixture. Hence a specific internal pressure which alongside the participating fluids' vapor pressure depends also on the temperature will develop inside the reservoir 110.

As can be seen in FIG. 1, the test device 100 furthermore has an ascending pipe 120 whose lower end is located fully in the liquid phase 112 of the fluid mixture 112. Located on the opposite, upper end of the ascending pipe 120 is a valve 122. When the valve 122 is opened, the internal pressure in the reservoir 110 will insure that the liquid fluid mixture 112 rises in the ascending pipe 120, traverses the valve, and is released via a nozzle 124. The released fluid mixture will pass quickly into the gaseous phase at a customary ambient pressure of approximately 1 bar. The fluid mixture that has passed into the gaseous phase and has both the target fluid and carrier fluid is identified in FIG. 1 by the reference numeral 134. The gaseous fluid mixture 134 will then mix with the ambient air 136 and thereby form the actual test-gas mixture 130.

Figure 2:
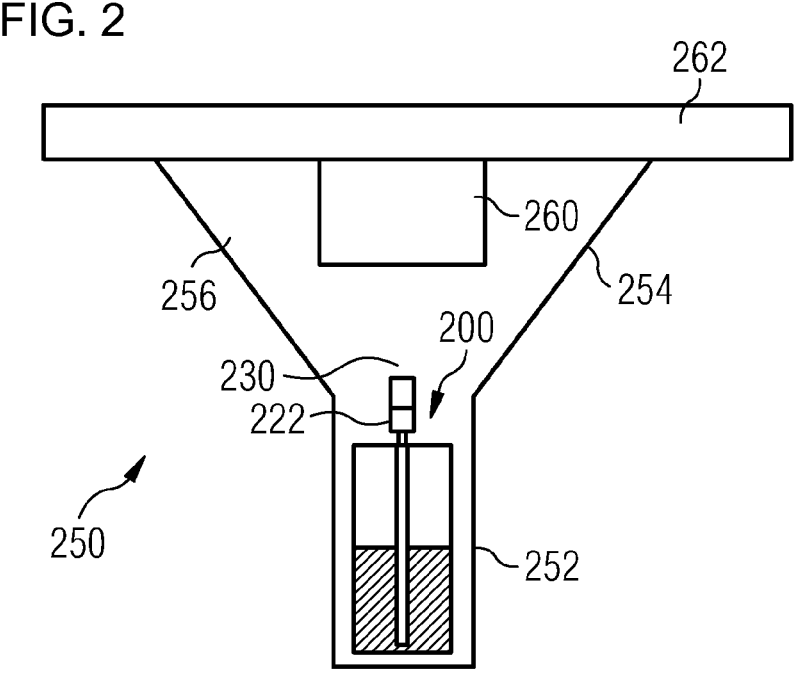
FIG. 2 is an illustration of the test system for checking the functioning capability of the gas-alarm annunciator, which system has a hood defining a test space and further has the test device shown in FIG. 1 and located in a holder.

FIG. 2 shows a test system 250 for checking the functioning capability of a gas-alarm annunciator 260 attached to a ceiling 262 of a room requiring to be monitored. The test system 250 has a test device 200 located in a schematically represented holder 252 of the test system 250. According to the exemplary embodiment shown here, the test device 200 is identical to the test device 100 shown in FIG. 1.

The test system 250 furthermore has a hood 254 which together with the ceiling 262 defines a test space 256. As can be seen in FIG. 2, the test space 256 is separated from the rest of the ambient region of the gas-alarm annunciator 260. The hood 254 is placed during the test operation over the gas-alarm annunciator 260 requiring to be checked, which will then accordingly be inside the test space 256.

For testing the gas-alarm annunciator 260, the test device 200 is thus in the holder 252. Attached to the holder is the hood 254 which according to the exemplary embodiment shown here is a bellows 254 that is upwardly open and slightly moveable. The bellows 254 is pushed over the gas-alarm annunciator 260 and forms a fairly tight seal with the ceiling 262. A valve 222 is then actuated for a period of, for example, 0.5 to 1 second so that a test-gas mixture 230 will be distributed within the test space 256. The test-gas mixture 230 will thereby be applied to the gas-alarm annunciator 260.

The holder 252 and the bellows 254 will not be moved for a relatively long time (at least 30 seconds, for instance) within the period. The length of time for which the test system 250 or hood 254 remains placed over the gas-alarm annunciator 260 and for which the actual test operation is performed is relatively long compared with the time during which the valve 222 is opened. If the gas-alarm annunciator 260 annunciates an alarm within the length of time it will be classified as capable of functioning; if it does not, then the gas-alarm annunciator 260 will need to be examined more closely.

FIGS. 3A and 3B are a schematic overview of the difference in apparatus-specific and functional terms between a known test device 390 in the case of which a target fluid 314$b$ is stored only in the gaseous phase and the test device 100, 300 already shown in FIG. 1 in the case of which the target fluid 312$b$ has been dissolved at least partially in a liquid phase of a carrier fluid 312$a$. In the test device 300 the liquid phase of the carrier fluid 312$a$ forms together with the dissolved target fluid 312$b$ the liquid phase of the fluid mixture 312. As already explained above, the vapor pressure of the fluid mixture 312 insures that in the test device 300 there will also be a gaseous fluid mixture 314 having the gaseous carrier fluid 314$a$ and gaseous target fluid 314$b$.

Immediately after a valve 322 has been actuated, the known test device 390 makes a gaseous target fluid 334$a$ available that mixes with the ambient air to form a test-gas mixture 330. The test device 300 described in this application initially makes a liquid fluid mixture available when the valve 322 is actuated. The mixture evaporates very quickly owing to the ambient pressure that is greatly reduced compared with the internal pressure in the test device 300, with the result that already in a short time a gaseous fluid mixture 334 will be present that will likewise mix with the ambient air to form a test-gas mixture 330.

Shown at the bottom of FIGS. 3A and 3B is in each case a co-ordinate system in which the relative amount of target fluid or target gas is plotted for the test device 390 and the test device 300 as a function of the number of test operations already performed using the respective test device 390, 300. As shown schematically in the graphs, the relative amount of target gas per test operation reduces very quickly in the case of the known test device 390. The relative amount of target gas conversely remains largely constant in the case of the test device 300.

To achieve the above-described characteristics of the described test device, a series of experimental investigations were carried out by the inventor that are described below with the aid of FIGS. 4, 5, 6, and 7.

A carrier fluid with the following properties was first sought that is suitable for carbon monoxide (CO):
(a) the carrier fluid is liquid at room temperature and at an overpressure of max. 5 to 6 bar;
(b) the carrier fluid must not influence attesting the presence of the target gas CO in the gas annunciator;
(c) The carrier fluid must not react chemically with the target gas CO; and
(d) the target gas must be soluble in the liquid carrier fluid.

Consideration was therefore given for practical and environmentally relevant reasons to n-butane, iso-butane, propane, dimethylether, 1,1,1,2-tetrafluorethane, or any mixtures thereof as possible carrier fluids.

However, scarcely any data is known from the technical literature about the solubility of the target gas CO in the various carrier fluids cited. The inventor has in particular found no data in the technical literature about the solubility of the target gas CO in carrier fluids such as, for instance, n-butane, cis-butane, or propane under pressure and at room temperature. Only an indication that CO ought to be soluble in liquid propane proceeds from solubility data for the hydrogen, CO, and propane system within a pressure range of 33.8 to 135.2 bar at 0° C. (International Union of Pure and Applied Chemistry, Solubility Data Series, Vol 5/6 Hydrogen and Deuterium, Pergamon Press 1981, p. 528). If in the system the data for CO is extrapolated first linearly to the amount zero for hydrogen and then quadratically to a pressure range of 3 bar to 11 bar, then the solubility of CO in liquid propane can be estimated to be approximately 10 $cm^3$ to 13 $cm^3$ of gaseous CO per $cm^3$ of liquid propane per bar. Propane could therefore possibly be used as the carrier fluid for producing an entire fluid mixture that contains CO as the target gas and which together with air could then produce the test-gas mixture for testing the CO gas-alarm annunciator described in this application.

The possibility of storing CO in liquid propane was therefore tested experimentally by the inventor. However, pure propane develops too high a pressure at +50° C. for standard low-pressure aluminum canisters. Propane was therefore mixed with n-butane and cis-butane to form a carrier-fluid mixture containing 58-66% (w/w) iso-butane, 0-2% (w/w) n-butane, and 34-42% (w/w) propane. A standard low-pressure aluminum canister having a capacity of 350 ml was filled with approximately 116 g of the liquid carrier-fluid mixture and CO then injected under pressure. The canister was shaken well for 1 minute and liquid samples were able to expand out of the canister into an infrared gas cell. The infrared absorption spectrum of the entire gas mixture in the infrared gas cell was then recorded. The infrared absorption spectra of 701 ppm CO in air and of the gaseous carrier-fluid mixture alone were recorded analogously.

Figure 4:
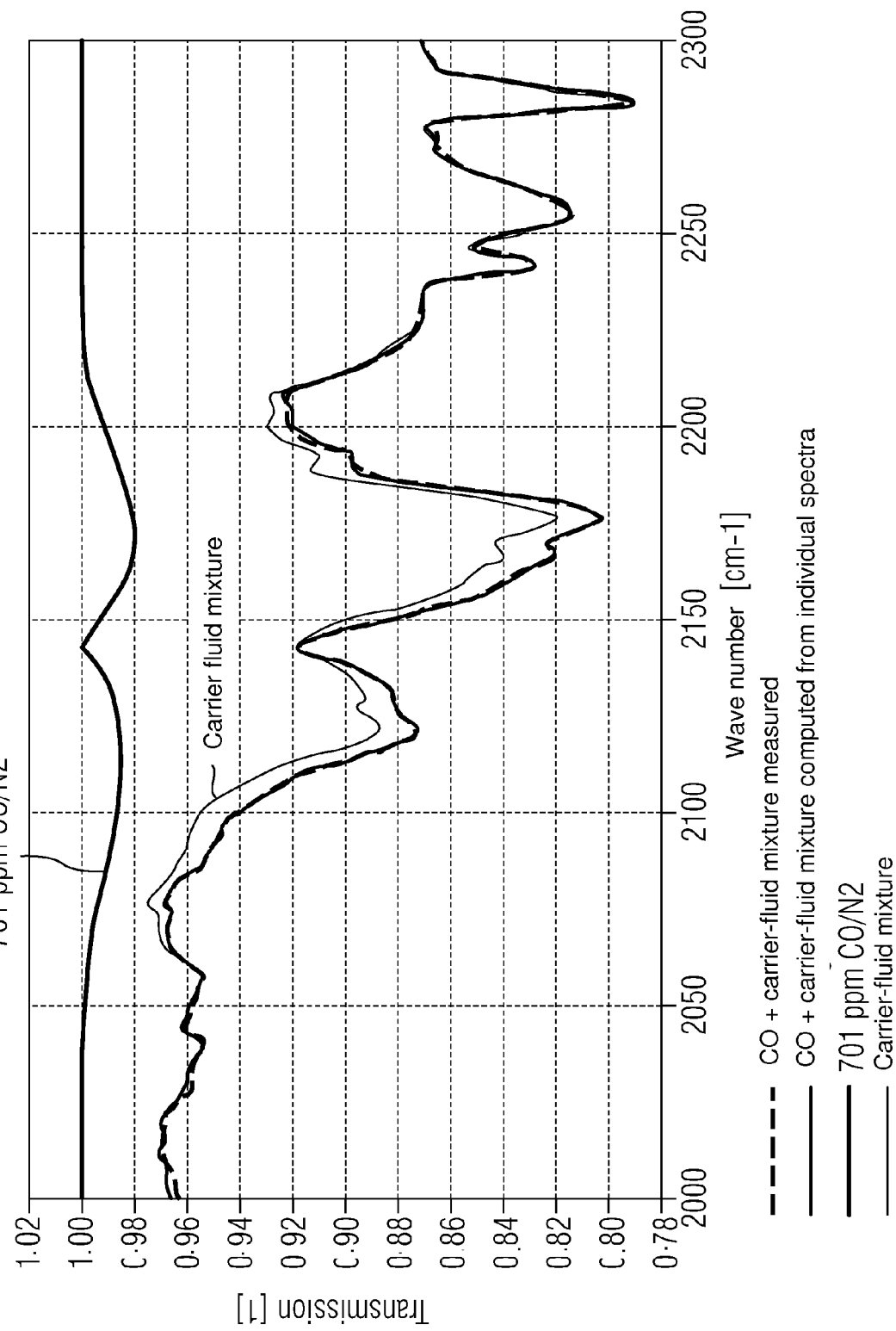
FIG. 4 is a graph showing an IR absorption spectrum for determining the concentration of carbon monoxide in a test-fluid mixture.

FIG. 4 shows the corresponding infrared spectra (IR spectra) all scaled to a constant pressure. The IR spectrum of the entire gas mixture was also computed from the sum of the individual IR spectra of CO and of the carrier-fluid mixture. The portions on which the summation was based were then varied until the experimental IR spectrum of the entire gas mixture could be reproduced exactly. In that way the concentration of CO in the entire gas mixture could be determined.

The entire gas mixture was then made to flow onto a gas-alarm annunciator for 232 tests each lasting 0.5 seconds, and after a certain number of tests the CO concentration in the discharging entire gas mixture was determined using IR spectroscopy again. Approximately 220 $cm^3$ of entire gas mixture per test developed therein. The relative amount of CO reaching the gas annunciator during each test was then computed from the measurements with reference to the initial value.

Figure 5:
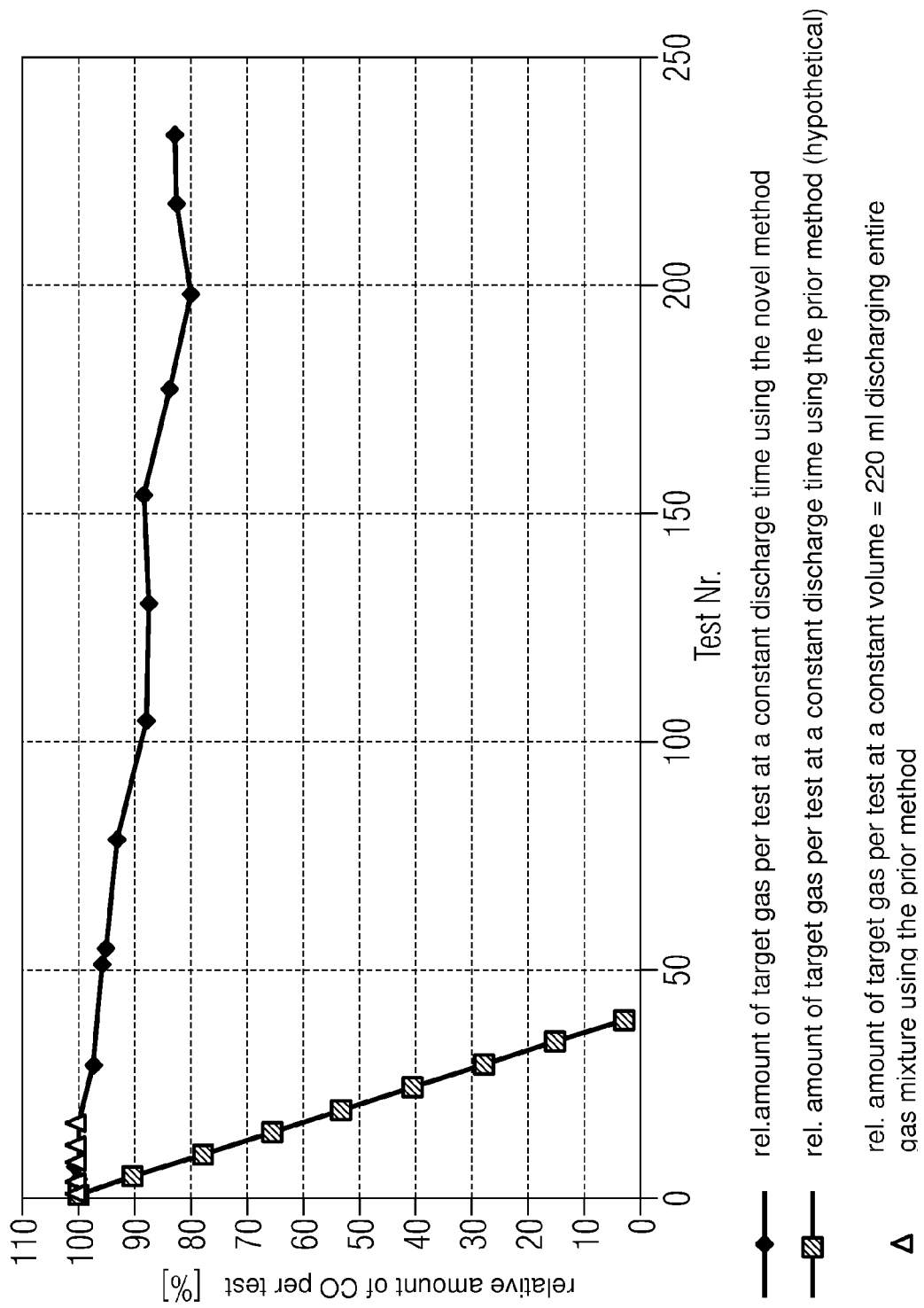
FIG. 5 is a chart showing the relative amount of the target gas carbon monoxide as a function of the number of test operations performed for a novel test method using a test device described in this application and for two known test methods using in each case a known test device.

The corresponding measured values are listed in FIG. 5 with the designation "rel. amount of target gas per test at a constant discharge time using the novel method". Shown also for comparison in FIG. 5 are two data records obtained during the application of prior test methods, with the canister in each case at a temperature of +25° C. at the start being under an initial pressure of 10 bar. A first data record was therein recorded for a first known test sequence during which approximately 40 hypothetical tests were performed always with a discharge time of roughly equal length and hence with a continuously reducing amount of extracted target gas. A second data record was recorded for a second known test sequence during which 220 ml of the entire gas mixture is always discharged onto the gas-alarm annunciator during each test operation so that the canister will be empty after 16 test operations.

FIG. 5 shows that at least 14 times more tests can be performed with the novel method than with the prior method with a constant amount of the target gas. The amount of CO reaching the gas-alarm annunciator varies in the novel method by a maximum of 20%, which is sufficiently precise for checking a gas-alarm annunciator. Compared with the prior method, for which approximately the same discharge time is used, the novel method exhibits a much more stable amount of the target gas per test. Approximately 6 times more tests are furthermore possible with the novel method. The novel method thus constitutes a very great improvement on the prior methods notwithstanding its being possible for the novel method to be performed using the economical standard low-pressure aluminum canisters.

Figure 6:
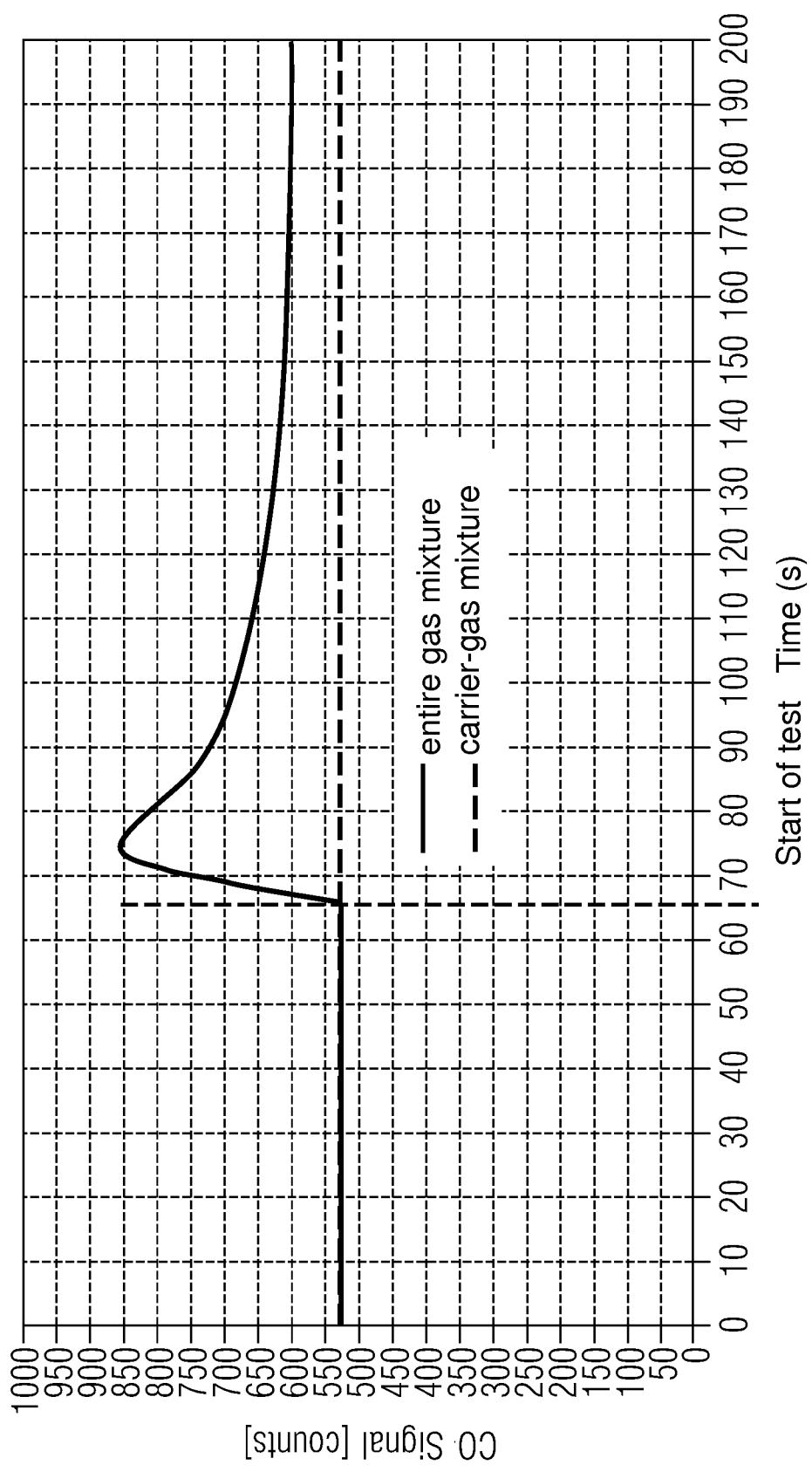
FIG. 6 is a chart showing as a function of time plots a carbon monoxide-gas sensor's output signal during a function test using the test device shown in FIG. 1.

FIG. 6 shows the signals of a gas-alarm annunciator, which is fitted with an electrochemical CO sensor, when either only the above-cited carrier-gas mixture or carrier-fluid mixture or the above-cited entire gas mixture or fluid mixture (=carrier-gas mixture+CO) is applied to it. As can be seen in FIG. 6, the electrochemical CO sensor detects only CO and not the components of the carrier-gas mixture n-butane, iso-butane, and propane. That means that the carrier-gas mixture used will not adversely affect attesting the presence of the target gas CO.

Figure 7:
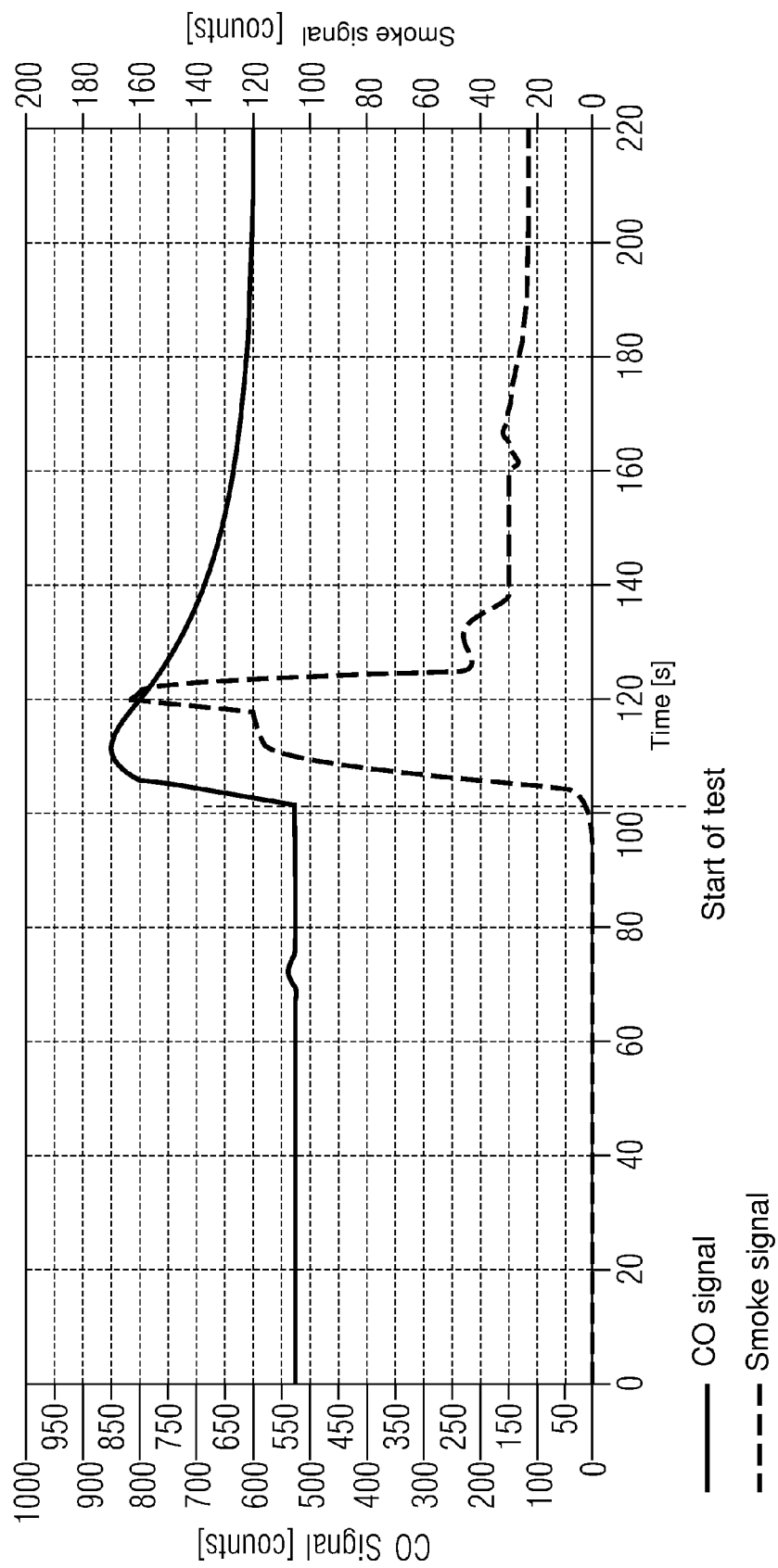
FIG. 7 is a chart showing as a function of time plots a carbon monoxide-gas sensor's output signal and an optical smoke sensor's output signal during a function test for which a test-gas mixture containing the target gas carbon monoxide and an aerosol precursor is used.

FIG. 7 is a chart which as a function of time plots (a) a carbon monoxide-gas sensor's output signal and (b) an optical smoke sensor's output signal during a function test in the case of which a test-gas mixture is used which, apart from a carrier gas, has the target gas CO and an aerosol precursor when the test begins. The test-gas mixture is obtained, as already explained above, from the liquid phase of a test-fluid mixture kept in a standard low-pressure aluminum canister. Sebacic acid bis-2-ethylhexylester was provided as the aerosol precursor, then n-butane, cis-butane, and propane along with some CO were added as the target gas and shaken well. Tests using a combined electrochemical CO-gas and optical smoke alarm were performed with the entire test-fluid mixture, now also containing an aerosol precursor alongside the target gas.

As can be seen in FIG. 7, both the CO gas-alarm annunciator's output signal and the optical smoke alarm's output signal exhibit a significant increase so that the test method described in this application for checking the functioning capability of a gas-alarm annunciator will function very well also for a combined alarm annunciator having also an optical smoke sensor alongside a gas sensor.

Attention is drawn to the fact that the embodiment variants described herein are only a limited selection of possible embodiment variants of the invention. Thus it is possible to suitably combine the features of individual embodiment variants so that a multiplicity of different embodiment variants can be regarded by a person skilled in the relevant art as obviously disclosed with the embodiment variants explicitly shown here.

The invention claimed is:

1. A test device for checking a functioning capability of a gas-alarm annunciator, the test device comprising:
   a target fluid;
   a carrier fluid;
   a reservoir for storing said target fluid and said carrier fluid, at least a part of said carrier fluid being present in a liquid aggregate state and said target fluid being at least partially dissolved in said carrier fluid being a liquid carrier fluid; and
   an extraction device engaging into said reservoir such that said target fluid can be extracted along with said liquid carrier fluid, said target fluid being constituted such that that on reaching a coverage area of the properly functioning gas-alarm annunciator, it will cause the gas-alarm annunciator to annunciate an alarm.

2. The test device according to claim 1, wherein said carrier fluid and said target fluid form a test-fluid mixture that is present in said reservoir partially in a liquid phase and partially in a gaseous phase.

3. The test device according to claim 2, wherein said extraction device has an ascending pipe with a first end and a second end, said first end being located inside said liquid phase of said test-fluid mixture, said extraction device further having an extraction valve for extracting said test-fluid mixture being attached to said second end.

4. The test device according to claim 2, wherein a concentration of said target fluid in the liquid phase of said test-fluid mixture is between 1 ppm and 10,000 ppm.

5. The test device according to claim 1, wherein said carrier fluid contains at least one substance selected from the group consisting of propane, n-butane, iso-butane, dimethylether, and 1,1,2-tetrafluorethane.

6. The test device according to claim 1, wherein said target fluid contains at least one substance selected from the group consisting of carbon monoxide, carbon dioxide, ethanol, and ammonia.

7. The test device according to claim 1, further comprising an aerosol precursor disposed in said reservoir.

8. The test device according to claim 7, wherein said aerosol precursor contains at least one substance selected from the group consisting of sebacic acid bis-2-ethylhexylester, sebacic acid diester with various ester groups, phthalic acid dibutyl ester, and phthalic acid bis-ethylhexyl ester.

9. The test device according to claim 1, further comprising an aromatic substance disposed in said reservoir.

10. A test system for checking a functioning capability of a gas-alarm annunciator, the test system comprising:
    a test device, containing:
        a target fluid;
        a carrier fluid;
        a reservoir for storing said target fluid and said carrier fluid, at least a part of said carrier fluid being present in a liquid aggregate state and said target fluid being at least partially dissolved in said carrier fluid being a liquid carrier fluid; and
        an extraction device that engages into said reservoir such that said target fluid can be extracted along with said liquid carrier fluid, said target fluid being constituted such that that on reaching a coverage area of the properly functioning gas-alarm annunciator, it will cause the gas-alarm annunciator to annunciate an alarm;
    a holding device for accommodating said test device; and
    a covering element attached to said holding device and embodied such that between said test device and a gas sensor of the gas-alarm annunciator a test space can be at least almost spatially separated from an ambient region of the gas-alarm annunciator.

11. A test method for checking a functioning capability of a gas-alarm annunciator, which comprises the steps of:
    providing a test device having a target fluid, a carrier fluid, and a reservoir for storing the target fluid and the carrier fluid, at least a part of the carrier fluid being present in a liquid aggregate state and the target fluid being at least partially dissolved in the carrier fluid being a liquid carrier fluid, the test device further having an extraction device engaging into the reservoir such that the target fluid can be extracted along with the liquid carrier fluid, the target fluid being constituted such that that on reaching a coverage area of the properly functioning gas-alarm annunciator, it will cause the gas-alarm annunciator to annunciate an alarm;
    introducing the liquid carrier fluid along with the target fluid dissolved therein into the coverage area of the gas-alarm annunciator; and
    checking a functioning capability of the gas-alarm annunciator, with the gas-alarm annunciator being classified as capable of functioning if the alarm is annunciated by the gas-alarm annunciator and with the gas-alarm annunciator (260) being classified as incapable of functioning if no alarm is annunciated.

12. A method for producing a test device having a reservoir and an extraction device engaging into the reservoir, which comprises the steps of:

filling the reservoir with a carrier fluid;

filling the reservoir with a target fluid, at least a part of the carrier fluid being present in a liquid aggregate state and the target fluid being at least partially dissolved in the carrier fluid; and sealing the filled reservoir so that an overpressure can be at least one of developed and be maintained in the reservoir.

13. The method according to claim 12, which further comprises evacuating the reservoir prior to the reservoir being filled with the carrier fluid and with the target fluid.

14. The method according to claim 12, which further comprises filling the reservoir with an inert gas at overpressure and emptying the reservoir prior to the reservoir being filled with the carrier fluid and with the target fluid.

* * * * *